(12) United States Patent
Johnson et al.

(10) Patent No.: US 7,755,303 B2
(45) Date of Patent: Jul. 13, 2010

(54) AUTOMOBILE LIGHTING PULSE WIDTH MODULATION DUTY CYCLE CONTROL WITH VOLTAGE AND TEMPERATURE COMPENSATION

(75) Inventors: Wade G. Johnson, Oxford, MI (US); Gonzalo Gonzalez, Sterling Heights, MI (US); Tracy L. Mack-Askew, Southfield, MI (US); Terrence B. McCloud, Davison, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 520 days.

(21) Appl. No.: 11/358,665

(22) Filed: Feb. 21, 2006

(65) Prior Publication Data

US 2007/0194725 A1 Aug. 23, 2007

(51) Int. Cl.
*G05F 1/00* (2006.01)

(52) U.S. Cl. ............... 315/308; 315/309; 315/291; 315/82; 315/247

(58) Field of Classification Search ............ 315/76–84, 315/307–309, 291, 247, 246, 224, 225, 347, 315/362, 149–159
See application file for complete search history.

(56) References Cited

U.S. PATENT DOCUMENTS

| | | | |
|---|---|---|---|
| 5,646,484 A * | 7/1997 | Sharma et al. ............... 315/74 |
| 6,426,569 B1 | 7/2002 | Ichikawa et al. | |
| 6,483,247 B2 | 11/2002 | Edwards et al. | |
| 6,614,358 B1 | 9/2003 | Hutchison et al. | |
| 6,963,175 B2 * | 11/2005 | Archenhold et al. ........ 315/291 |
| 7,091,874 B2 * | 8/2006 | Smithson ............... 340/815.45 |
| 7,269,191 B2 * | 9/2007 | Stewart et al. ................ 372/34 |
| 7,307,386 B2 * | 12/2007 | Fishbein et al. ............ 315/226 |
| 2004/0178737 A1 * | 9/2004 | Takeda et al. ................. 315/77 |
| 2005/0179404 A1 * | 8/2005 | Veskovic et al. ............ 315/291 |
| 2006/0245174 A1 * | 11/2006 | Ashdown et al. .............. 362/85 |
| 2007/0024213 A1 * | 2/2007 | Shteynberg et al. ......... 315/291 |
| 2007/0035255 A1 * | 2/2007 | Shuster et al. .......... 315/200 R |
| 2007/0200512 A1 * | 8/2007 | Gotou et al. ................ 315/309 |
| 2007/0285031 A1 * | 12/2007 | Shteynberg et al. ......... 315/294 |

* cited by examiner

*Primary Examiner*—Tuyet Vo
(74) *Attorney, Agent, or Firm*—Ingrassia Fisher & Lorenz, P.C.

(57) ABSTRACT

An automobile circuit includes a power source, a temperature sensor outputting temperature measurement data, a voltage sensor outputting system voltage measurement data, a voltage adjusting module configured to receive the temperature measurement data and the voltage measurement data, and responsive thereto, to output a pulse width modulation signal, a switch that is electrically coupled to the power source and to the voltage adjusting module, the switch being operable to receive the pulse width modulating signal and thereby regulate a duty cycle for voltage from the power source, and a lighting component coupled to receive the voltage from the switch.

20 Claims, 2 Drawing Sheets

AUTOMOBILE LIGHTING PULSE WIDTH MODULATION DUTY CYCLE CONTROL WITH VOLTAGE AND TEMPERATURE COMPENSATION

TECHNICAL FIELD

The present invention generally relates to automobile external lights and lighting assemblies, and more particularly relates to methods and systems for regulating voltage supplied to the external lights.

BACKGROUND OF THE INVENTION

Automobiles are routinely supplied with exterior lighting including headlamps, brake lights, and warning lights. Each lighting component has a rated voltage for which the component operates at a given intensity and efficiency. Operation at the prescribed voltage optimizes the lighting component's performance and life expectancy.

Determinants that affect the voltage that is supplied to a lighting component include the ambient temperature and the system voltage signal. At colder ambient temperatures, wire resistance is decreased. As a result, conductivity is increased and more current is able to pass through the lighting component. Also, system voltage increases result in an increased voltage supply to the lighting component. For either situation, the power output across the lighting component will reduce the component's life expectancy due to filament burn out resulting from excess heat generation.

One existing design modification that is directed toward reduced voltage that is supplied to a lighting component includes adding wiring to the lighting circuit in the same manner by which the intensity of daytime running lights is controlled. Daytime running lights are low intensity lamps that improve an approaching automobile's external visibility. Since daytime running lights only need to be relatively dim, the voltage is reduced by increasing the amount of wire in the daytime running lights circuit relative to that of the nighttime headlamps. The additional wire increases resistance in the daytime running lights circuit and consequently reduces the voltage and current passing therethrough. Similarly, voltage and current can be limited to other exterior lighting by simply increasing the amount of wire in the circuitry, thereby ensuring that the rated voltage for each lighting component is not exceeded to a significant extent. One drawback to this solution is the cost and inefficiency associated with supplying and installing the additional wire. Another disadvantage is that added resistance reduces light output, causing the exterior lighting to be too dim while degrading the overall lighting performance when temperatures and system voltage would ordinarily be satisfactory for normal lighting operation. Further, adding a constant resistance only produces a mean shift in voltage, and therefore in lighting performance, and fails to affect voltage variation.

Another inherent deficiency in adding additional wire to a lighting circuit is that the solution does not address problems arising when ambient temperatures are relatively high or when system voltage is relatively low. Increases in ambient temperature increase wire resistance and reduce conductivity, which in turn causes less current to pass through the lighting component. Also, a reduction in system voltage reduces the voltage that is supplied to the lighting component. Either situation causes an undesirable reduction in light intensity from a lighting component.

Accordingly, there is a need for a system that consistently provides voltage to lighting components at a predetermined level such as the component's rated voltage. There is also a need to provide such a system that reduces voltage variation without reducing the light intensity from the component, and that can be implemented at a relatively low cost.

SUMMARY OF THE INVENTION

An automobile circuit is provided to meet the above-described needs. The circuit includes a power source, a temperature sensor outputting temperature measurement data, a voltage sensor outputting system voltage measurement data, a voltage adjusting module configured to receive the temperature measurement data and the voltage measurement data, and responsive thereto, to output a pulse width modulation signal, a switch that is electrically coupled to the power source and to the voltage adjusting module, the switch being operable to receive the pulse width modulating signal and thereby regulate a duty cycle for voltage from the power source, and a lighting component coupled to receive the voltage from the switch.

A method of regulating the duty cycle for a voltage delivered from a power source to a lighting component through a lighting circuit is also provided to meet the above-described needs. Temperature measurement data is input from a temperature sensor into a voltage adjusting module, and system voltage measurement data is input from a voltage sensor into the voltage adjusting module. In response to the temperature measurement data and the system voltage measurement data, a pulse width modulation signal is output from the voltage adjusting module to a switch in the lighting circuit, the switch being operable to receive the pulse width modulating signal and thereby regulate the duty cycle for the voltage delivered to the lighting component.

A system for regulating the duty cycle for a voltage delivered from a power source to a lighting component through a lighting circuit is also provided to meet the above-described needs. The system includes a voltage adjusting module that is configured to receive temperature measurement data from a temperature sensor and system voltage measurement data from a voltage sensor, and to output a pulse width modulation signal to a switch in the lighting circuit in response to the temperature measurement data and the system voltage measurement data to thereby regulate the duty cycle for the voltage delivered to the lighting component.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to voltage control circuitry for automobile lighting, and particularly to reduce the performance variation of light bulbs, lamps, beams, and other exterior lighting attributable to changes in the ambient operating temperature and/or the system voltage that is supplied to the lighting. The voltage control circuitry substantially eliminates lighting performance variation as it relates to light intensity and voltage overload by introducing into a control module a duty cycle algorithm that modulates a pulse width for the voltage supplied to the automobile lighting based on ambient temperature and system voltage inputs.

Figure 1:
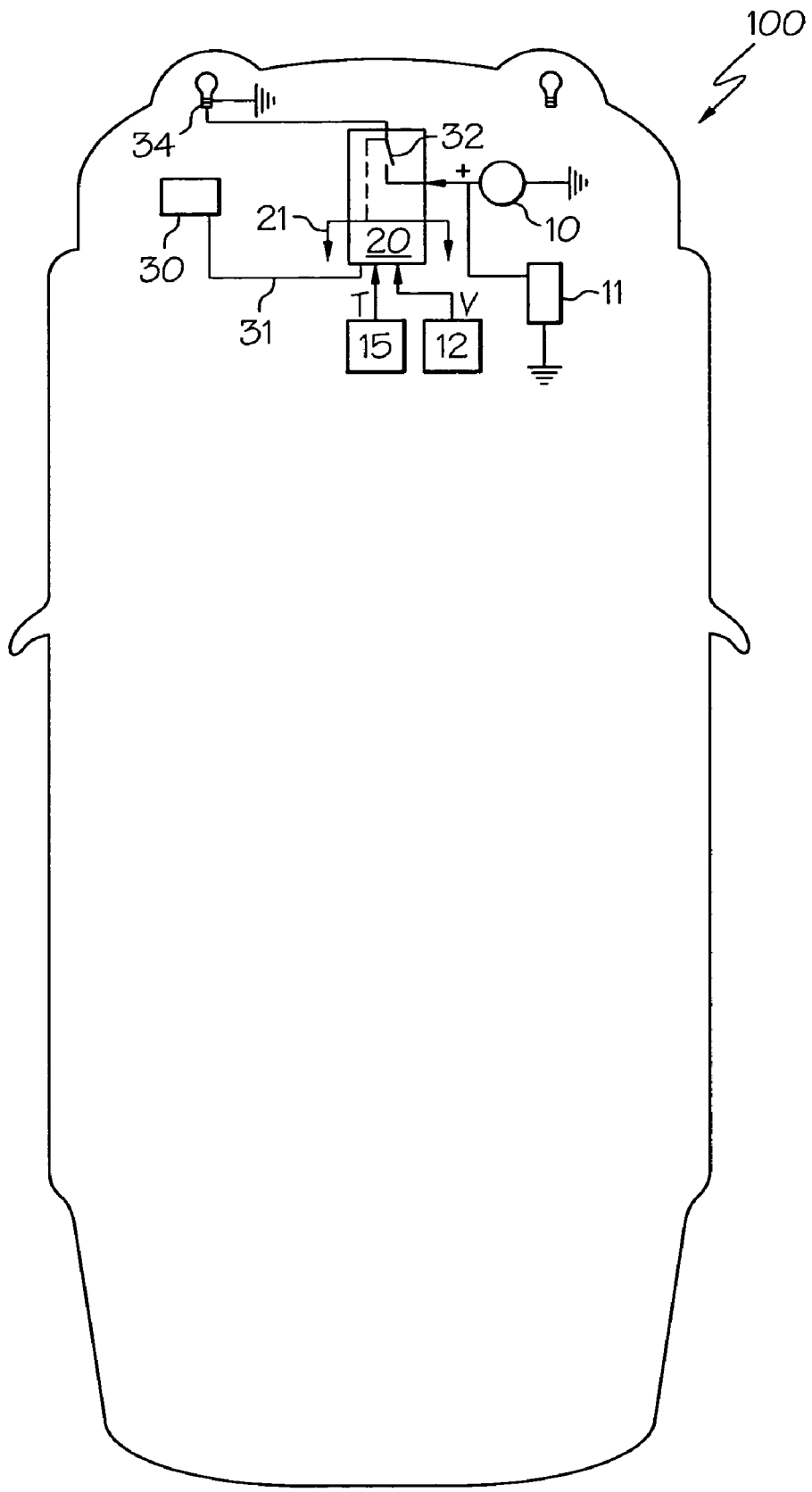
FIG. 1 is a top internal view depicting a vehicle, including a block diagram of an exemplary lamp voltage control circuit.

FIG. 1 is a top interior view of an automobile 100, including an exemplary lamp voltage control circuit. The circuit is represented in conjunction with head lamps as lighting components 34, although other exterior lighting such as brake lights and warning lights may be regulated using the same type of circuitry. A power source such as a battery 10 and/or a generator 11 outputs a voltage to a pulse width modulating switch 32. Based on the duty cycle algorithm, a pulse modulating unit 20 outputs a signal to the switch 32 to control the pulse width modulation for at least one automobile lighting component 34.

The duty cycle algorithm stored in the pulse modulating unit 20 is configured to receive inputs from an activation signal 31, a temperature input T, and a system voltage input V. The activation signal 31 is sent from a controller 30 or other logic source, and may include lamp activation and deactivation requests for the lighting component 34 to be either on or off. The controller 30 that transmits the activation signal 31 may be a driver-initiated component, a security component, an automatic lighting control component, any other lamp activation component, or a discrimination component that receives signals from such components and determines that the signals are light activation signals. The activation signal 31 may also include a lamp intensity request for the lighting component 34 to function at one of a plurality of predetermined brightness intensities including low beam intensity, high beam intensity, and daytime running light intensity. Similarly, if the lighting component 34 is a different lamp such as a taillight, the lamp intensity request may indicate that the lighting component 34 should function at other brightness intensities including braking intensity, turn signal intensity, and parking intensity. The temperature input T originates from a temperature sensor 15 disposed on the automobile at a position where the duty cycle algorithm can estimate the ambient temperature experienced by the lighting circuitry wiring. The system voltage input V originates from a system voltage sensor 12 that may be directly or indirectly connected to a voltage source such as the battery 10 and/or the alternator 11. The pulse modulating unit 20 and the switch 32 may be housed in the same or different containers, as indicated by line 21.

Figure 2:
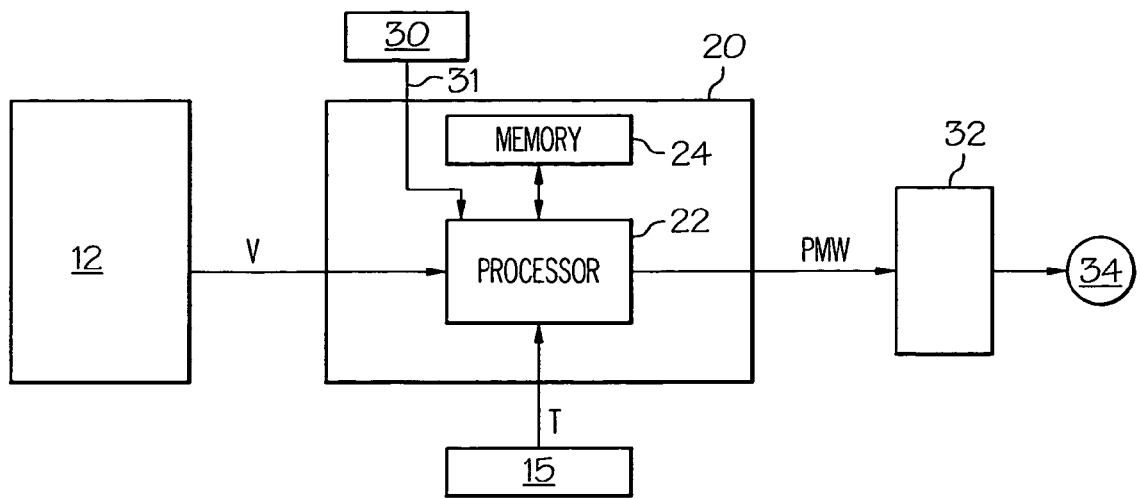
FIG. 2 is a block diagram of an exemplary lamp voltage control method.

Turning now to FIG. 2, a block diagram depicts an exemplary modulating unit 20 and its components, along with a method of controlling the voltage supplied to the automobile lighting components 34 using the modulating unit 20. A processor 22 and a memory 24 are included in the modulating unit 20. The memory 24 is a flash memory, a RAM, a ROM, or other storage medium containing the duty cycle algorithm that is used to control the voltage output from the modulating unit 20. According to one exemplary embodiment, the duty cycle algorithm is hard coded in the modulating unit 20, meaning that the algorithm is either a permanent component of the processor 22 or stored in the memory 24 in a non-modifiable manner. In such a case, the modulating unit 20 may be customized for particular lighting components having distinctive operating voltages, such as the components' rated voltages. In another embodiment, the duty cycle algorithm is stored in an open-ended manner. For example, the modulating unit 20 may be manufactured as a programmable device that is adapted for use with a variety of lighting components with different rated voltages. After selecting a particular lighting component that will be electrically coupled to the modulating unit 20, the duty cycle algorithm may be flash programmed or otherwise stored in the memory 24. The manufacturer may transmit the duty cycle algorithm to the processor 22, which then stores the algorithm in the memory 24.

According to a method of using the modulating unit 20, data is input into the processor 22 pertaining to a determinant that might require a voltage to be modified before being received by the lighting component 34. As previously discussed, one such determinant is the ambient temperature. At colder ambient temperatures, wire resistance in the lighting circuitry is decreased. Consequently, conductivity is increased and more voltage and current is able to pass through to the lighting component. Conversely, a high ambient temperature increases wire resistance and decreases conductivity, which in turn causes less current to pass through the lighting component.

To account for changes in ambient temperature, the duty cycle algorithm is configured to adjust a lamp voltage based at least on input data relating to ambient temperature. A temperature sensor 15 is disposed on the automobile at a position where the duty cycle algorithm can estimate the ambient temperature experienced by the lighting circuitry wiring. The duty cycle algorithm includes temperature deviation logic that factors the sensed temperature along with sensor and circuitry locations, operating conditions, and any factor necessary to approximate the lighting circuitry ambient temperature. Temperature measurement data, designated as T in FIG. 2, are input into the processor 22, which plugs the determinant into the duty cycle algorithm and outputs a pulse width modulating signal, designated as PWM in FIG. 2, to the switch 32 as necessary. The duty cycle is defined as the $t_{on}/p$, wherein p is the voltage signal period, and $t_{on}$ is the voltage pulse width that repeats in each period of the signal. The duty cycle algorithm determines whether the ambient temperature determined by the temperature sensor 15 is higher or lower than a predetermined value. If the ambient temperature is higher than the predetermined value, the duty cycle algorithm causes the modulating unit 20 to increase the duty cycle that is output to the lighting component 34. Likewise, if the ambient temperature is lower than the predetermined value, the duty cycle algorithm causes the modulating unit 20 to decrease the duty cycle. The duty cycle algorithm preferably increases the output voltage by broadening the pulse width for the voltage signal, and decreases the output root mean square voltage by shortening the pulse width for the voltage signal. The output voltage from the switch 32 is increased at higher temperature. However the additional voltage is dissipated in the higher temperature circuitry, maintaining constant output at the lighting component 34. The opposite is true for lower temperature.

The duty cycle algorithm is also configured to adjust for variations in the system voltage, designated as V in FIG. 2. A value for the system voltage is received by the processor 22, which plugs the determinant into the duty cycle algorithm. The duty cycle algorithm factors the system voltage and circuit voltage losses, and determines if such factors translate to a predetermined operating voltage for the lighting component 34, including but not limited to the component's rated voltage. As one example, the voltage at the lighting component 34 may be calculated as the system voltage minus harness voltage losses, which are highly temperature dependant. As necessary, the processor 22 adjusts the pulse width modulating signal PWM. Taking into account voltage losses, the duty cycle is reduced at higher system voltages to maintain constant output at lighting component 34. Likewise at lower system voltages, the duty cycle is increased to maintain constant output at lighting component 34.

Figure 3:
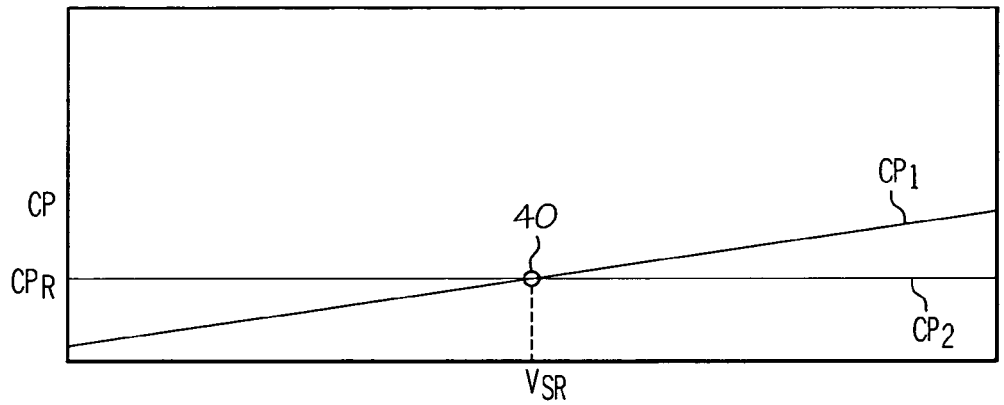
FIG. 3 is a graph of traces representing candle power versus system voltage, trace $CP_2$ representing an exemplary lamp voltage circuit that includes a pulse width modulation module, and trace $CP_1$ representing a conventional circuit that does not include a pulse width modulation module.
Figure 4:
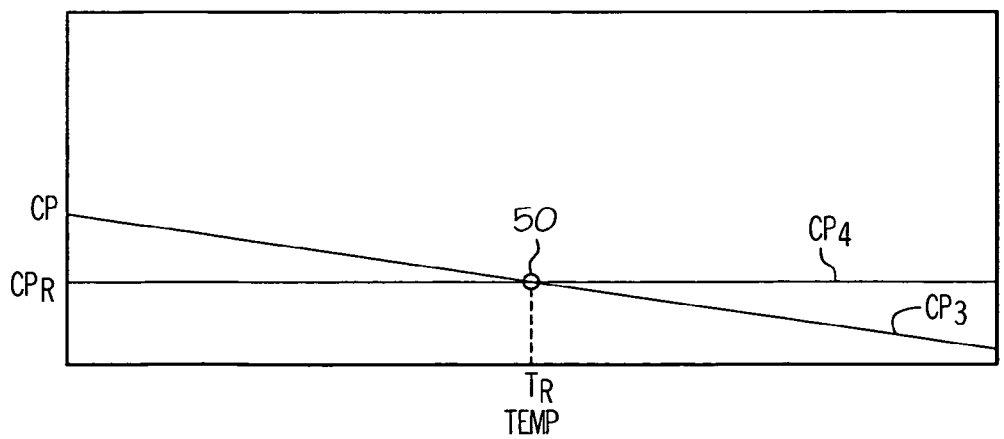
FIG. 4 is a graph of traces representing candle power versus ambient temperature, trace $CP_4$ representing an exemplary lamp voltage circuit that includes a pulse width modulation module, and trace CP₃ representing a conventional circuit that does not include a pulse width modulation module.

FIGS. 3 and 4 are graphs of traces representing, respectively, candle power versus system voltage and candle power versus temperature. Each graph includes two curves, one curve representing an exemplary lighting circuit that includes a pulse width modulation module, and another curve representing a conventional circuit that does not include a pulse width modulation module. In FIG. 3, the curve CP1 represents a conventional lighting circuit. At a system voltage $V_{SR}$ that results in a lighting component's rated voltage $V_R$, the component operates at an optimal candle power $CP_R$. The lighting component's candle power is directly proportional to the root mean square voltage at the component. Thus, the curve CP1 for the conventional lighting circuit has a positive slope. A system voltage above $V_{SR}$ results in lighting component voltages greater than $V_R$ and may cause voltage overload for the lighting component, resulting in premature failure due to filament burn out. As previously discussed, a conventional way to prevent voltage overload is to increase the amount of wire in the lighting circuit, effectively shifting the curve CP1 to the right. However, the addition of wire to the lighting circuit causes the system voltage to be below $V_R$, and the lighting component to operate at an undesirably dim candle power.

In contrast, the curve CP2 represents a lighting circuit that includes the pulse width modulation module 20 that utilizes a duty cycle algorithm. Since the module 20 manipulates the switch 32 to produce a voltage signal with a broadened or decreased pulse width based on variations in the system voltage and voltage losses, the curve CP2 is a substantially horizontal line that represents an optimal candle power $CP_R$ across a wide range of system voltages.

In FIG. 4, the curve CP3 represents a conventional lighting circuit. At an ideal ambient temperature $T_R$, the component's candle power is at an optimal output $CP_R$. The lighting component's candle power is inversely proportional to the ambient temperature since low temperatures reduce the resistance of the lighting circuitry wiring, and consequently increase the voltage supplied to the lighting component. Thus, the curve CP3 for the conventional lighting circuit has a negative slope. Since a high candle power is indicative of a high voltage supplied to a lighting component, an ambient temperature below $T_R$ may cause voltage overload for the lighting component. The addition of wire to the lighting circuit causes the $T_R$ to increase, effectively shifting the curve CP3 to the left, and causes the lighting component to operate at an undesirably dim candle power.

In contrast, the curve CP4 represents a lighting circuit that includes the pulse width modulation module 20 that utilizes an exemplary duty cycle algorithm. Since the module 20 manipulates the switch 32 to output a voltage signal with a broadened or decreased pulse width based on variations in ambient temperature, the curve CP4 is a substantially horizontal line that represents an optimal candle power $CP_R$ across a wide range of ambient temperatures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An automobile lighting circuit, comprising:
   a power source;
   a temperature sensor outputting ambient temperature measurement data;
   a voltage sensor coupled to the power source and configured to determine a system voltage therefrom and to output system voltage measurement data based on the system voltage;
   a voltage adjusting module configured to receive the ambient temperature measurement data and the system voltage measurement data, and responsive to both the ambient temperature measurement data and the system voltage measurement data thereto, to estimate a voltage loss in the lighting circuit based on the ambient temperature measurement data, the system voltage measurement data, or both, and to output a pulse width modulation signal in response to the voltage loss;
   a switch that is electrically coupled to the power source and to the voltage adjusting module, the switch being operable to receive the pulse width modulating signal and regulate a duty cycle for voltage from the power source based on the voltage loss to maintain a constant output voltage; and
   a lighting component coupled to receive the constant output voltage from the switch.

2. The automobile lighting circuit according to claim 1, wherein the switch is operable to regulate the duty cycle by regulating a pulse width for voltage from the power source.

3. The automobile lighting circuit according to claim 1, further comprising:
   an activation component outputting a light activation signal; wherein the voltage adjusting module is further configured to output the pulse width modulation signal in response to the light activation signal.

4. The automobile lighting circuit according to claim 1, wherein the lighting component has at least one predetermined operating output, and the voltage adjusting module is configured to output the pulse width modulation signal and thereby produce a root mean square voltage that generates the predetermined operating output.

5. The automobile lighting circuit according to claim 4, wherein the voltage adjusting module is configured to increase the duty cycle if the system voltage is too low to produce the predetermined operating output.

6. The automobile lighting circuit according to claim 4, wherein the voltage adjusting module is configured to decrease the duty cycle if the system voltage is too high to produce the predetermined operating output.

7. The automobile lighting circuit according to claim 4, wherein the voltage adjusting module is configured to determine whether values from the temperature measurement data match a predetermined value, and to increase the duty cycle if values from the temperature measurement data are greater than the predetermined value.

8. The automobile lighting circuit according to claim 4, wherein the voltage adjusting module is configured to determine whether values from the temperature measurement data match a predetermined value, and to decrease the duty cycle if values from the temperature measurement data are lower than the predetermined value.

9. A method of regulating the duty cycle for a voltage delivered from a power source to a lighting component through a lighting circuit, the method comprising:
  imputing ambient temperature measurement data from a temperature sensor into a voltage adjusting module;
  inputting system voltage measurement data from a voltage sensor into the voltage adjusting module, the system voltage measurement data comprising a system voltage from the power source;
  estimating a voltage loss in the lighting circuit based on the ambient temperature measurement data, the system voltage measurement data, or both; and
  outputting a pulse width modulation signal from the voltage adjusting module to a switch in the lighting circuit in response to the voltage loss to maintain a constant output voltage, the switch being operable to receive the pulse width modulating signal and regulate the duty cycle for the voltage delivered to the lighting component based on the voltage loss to provide the constant output voltage to the lighting component.

10. The method according to claim 9, wherein the switch is operable to regulate the duty cycle by regulating a pulse width for the voltage from the power source.

11. The method according to claim 9, further comprising:
  inputting a light activation signal from an activation component into the voltage adjusting module; and
  wherein outputting the pulse width modulation signal from the voltage adjusting module is further in response to the light activation signal.

12. The method according to claim 9, wherein the lighting component has at least one predetermined operating output, and outputting the pulse width modulation signal produces a root mean square voltage that generates the predetermined operating output.

13. The method according to claim 12, wherein outputting the pulse width modulation signal increases the duty cycle if the system voltage is too low to produce the predetermined operating output.

14. The method according to claim 12, wherein outputting the pulse width modulation signal decreases the duty cycle if the system voltage is too high to produce the predetermined operating output.

15. The method according to claim 12, wherein the voltage adjusting module is configured to determine whether values from the temperature measurement data match a predetermined value, and wherein outputting the pulse width modulation signal increases the duty cycle if values from the temperature measurement data are greater than the predetermined value.

16. The method according to claim 12, wherein the voltage adjusting module is configured to determine whether values from the temperature measurement data match a predetermined value, and wherein outputting the pulse width modulation signal decreases the duty cycle if values from the temperature measurement data are lower than the predetermined value.

17. A system for regulating the duty cycle for a voltage delivered from a power source to a lighting component through a lighting circuit, the system comprising:
  a voltage adjusting module configured to receive ambient temperature measurement data from a temperature sensor and system voltage measurement data from a voltage sensor, the system voltage measurement data comprising a system voltage from the power source, to estimate a voltage loss in the lighting circuit based on the ambient temperature measurement data, the system voltage measurement data, or both, and to output a pulse width modulation signal to a switch in the lighting circuit in response to the voltage loss to regulate the duty cycle for the voltage delivered to the lighting component based on the voltage loss to provide a constant output voltage to the lighting component.

18. The system according to claim 17, wherein the voltage adjusting module is further configured to receive a light activation signal from an activation component, and to output the pulse width modulation signal in response to the light activation signal.

19. The system according to claim 17, wherein the lighting component has at least one predetermined operating output, and the voltage adjusting module is configured to output the pulse width modulation signal and thereby produce a root mean square voltage that generates the predetermined operating output.

20. The system according to claim 17, further comprising:
  the switch that receives the pulse modulation signal, the switch being electrically coupled to the voltage adjusting module and further adapted to be electrically coupled to the power source, the switch being operable to receive the pulse width modulating signal and thereby regulating a pulse width for the voltage from the power source.

* * * * *